United States Patent

Sink

Patent Number: 6,088,209
Date of Patent: Jul. 11, 2000

[54] VOLTAGE SPIKE SUPPRESSOR

[75] Inventor: John Sink, Yorba Linds, Calif.

[73] Assignee: Power Paragon, Inc., Anaheim, Calif.

[21] Appl. No.: 09/196,271

[22] Filed: Nov. 19, 1998

[51] Int. Cl.[7] .................................................. H02H 3/20
[52] U.S. Cl. .............................. 361/111; 361/58; 361/118
[58] Field of Search ................................ 361/54, 56, 88, 361/91.1, 91.5, 111, 117, 118

[56] References Cited

U.S. PATENT DOCUMENTS

| | | | |
|---|---|---|---|
| 4,271,446 | 6/1981 | Comstock | 361/56 |
| 4,870,528 | 9/1989 | Harford | 361/56 |
| 5,038,245 | 8/1991 | Gronskog | 361/56 |
| 5,610,793 | 3/1997 | Luu | 361/111 |
| 5,646,810 | 7/1997 | Funke | 361/56 |
| 5,784,236 | 7/1998 | Tardiff et al. | 361/56 |

OTHER PUBLICATIONS 3 pages from web site at http://www.maida.thomasregister.com/olc/maida/c_vrist1.htm, Varistors, Maida Development Company, 20–T South Libby St. Hampton, VA 23663, 1999.

13 page Product catalog, MCG Surce Protection, Surge Protection for AC Power Lines, MCG Electronics, Inc. 12 Burt Drive, Deer Park, N.Y. 11729, Fall/Winter 1997.

1 page from web site at http://www.mcgsurge.com/1999/acline.htm, AC Power Line Surge Protection, MCG Surge Protection, Aug. 9, 1999.

3 page Product brochure, "SurgX . . . What it is and how does it work?", Cooper Bussmann Mkt Bulletin #99–04, Apr. 5, 1999.

2 page Product brochure, Wall–Mounted Products, GE Tranquell TVSS, General Electric Corporation, 381 Broadway, Ft. Edward, NY 12828, 1999.

5 pages from web site at http://www.ge.com/capacitor/product/powqual/tvss/guideforms/wallmount.html, Guideforms Specs—Tranquell VII (Date unknown).

2 pages from web site at http:www//ev.siemens.de/uk/arrester/index.htm, Surge Arresters and Limiters, Siemens AG, Bereich Energieubertraung und –verti, copyright 1998/99.

1 page from web site at http://www.siemens.de/pr/inf/70/e/0000000.htm, SIOV Metal Oxide Varistors, Siemens Matsushita Components, copyright 1999.

2 page Product Brochure, Metal Oxide Varistor—SIOV—, Siemens Matsushita Components (Date unknown).

20 page Product brochure, Surge Arresters, Wickmann USA, Inc., 4100 Shirley Drive, Atlanta Georgia 30336, 1994.

*Primary Examiner*—Jeffrey Gaffin
*Assistant Examiner*—Kim Huynh
*Attorney, Agent, or Firm*—Faegre & Benson LLP

[57] ABSTRACT

A voltage spike suppressor for polyphase systems including those with alternatively connectable polyphase sources, the suppressor having a diode bridge network connected to couple overvoltage transients exceeding the nominal line voltage by more than twice the forward drop of a diode in the bridge network to a capacitor and resistor network. In four-wire systems, a center-tap in the capacitor and resistor network can be connected to the neutral lead in the power circuit. Metal Oxide Varistors may be used to clamp the center-tap voltage in the capacitor-resistor network. A diode clamp circuit may be used to limit common-mode voltage transient swings in the capacitor-resistor network and in the neutral terminal when present.

18 Claims, 15 Drawing Sheets

VOLTAGE SPIKE SUPPRESSOR

BACKGROUND OF THE INVENTION

The present invention relates to the field of voltage spike suppressors, particularly in the field of static transfer switches and solid state current interrupters.

DETAILED DESCRIPTION OF THE INVENTION

Figure 1:
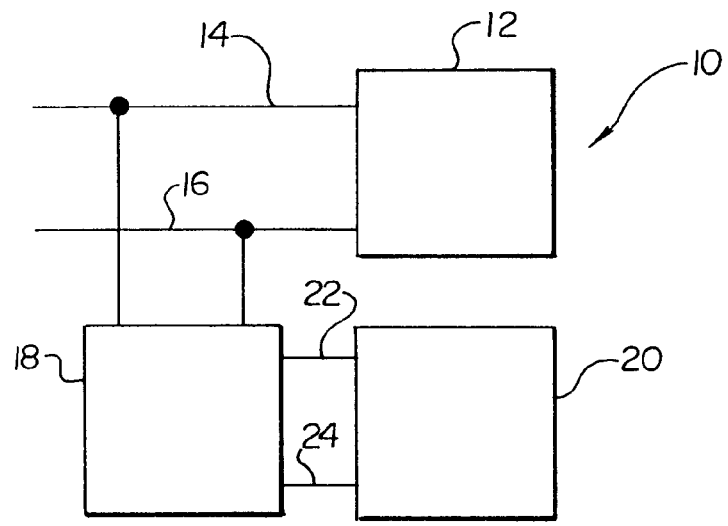
FIG. 1 is a block diagram of a first embodiment of the present invention.
Figure 2:
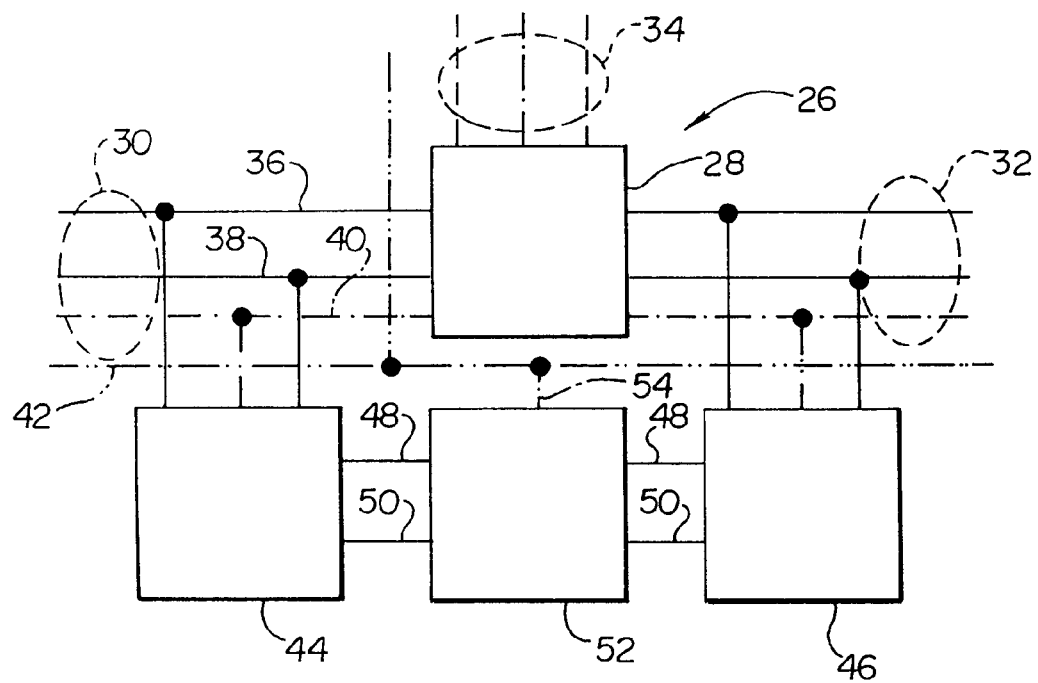
FIG. 2 is a block diagram corresponding to further embodiments of the present invention.
Figure 3:
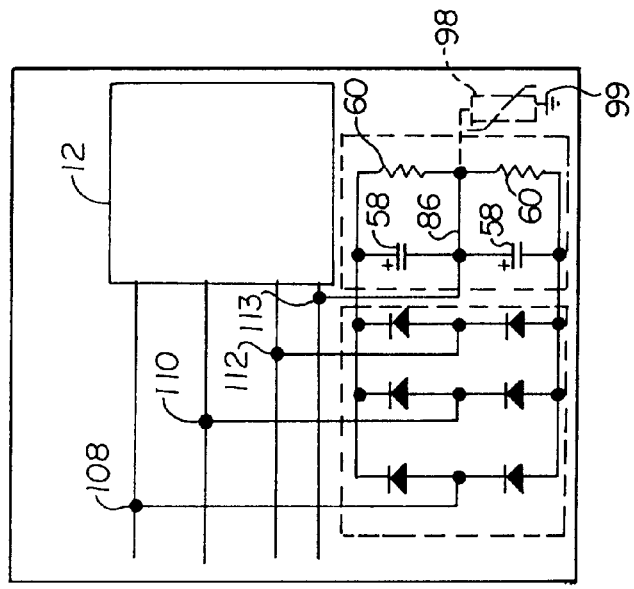
FIG. 3 is a circuit diagram for the block diagram of FIG. 1 showing a single-phase, two wire embodiment useful in the practice of the present invention.

Referring to the Figures, and most particularly to FIGS. 1 and 3, a block diagram 10 of the present invention may be seen. It is to be understood that block diagram 10 is for a single phase, single ended arrangement having a unit or circuit to be protected 12, at least a pair of power lines 14, 16 connected to unit 12, a diode bridge 18 and a capacitor-resistor network 20 connected to the diode bridge 18 via a pair of lines 22, 24. Referring now to FIG. 2, a block diagram 26 relating to various alternative embodiments of the present invention may be seen. In the arrangement of FIG. 2, a block 28 (which may be, for example, a solid state interrupter or static transfer switch) may have two (30, 32) or three (30, 32, 34) groups of power connections. Each group of power lines or connections are preferably made up of two or three power lines, e.g., lines 36, 38, 40 for group 30. In addition, a neutral line 42 may be included, for example, in a three-phase, four wire arrangement. Device 28 may be a solid state interrupter, in which case groups 30 and 32 would be present, and group 34 absent. Alternatively, device 28 may be a static transfer switch, in which case, all three groups 30, 32, 34 would be present, typically with one of groups 34 being a primary input power line group, and one of the groups 30 or 32 connected to a load, and the other of groups 30, 32 connected to an alternate source or load, as the case may be. In the arrangement 26 shown in FIG. 2, a pair of diode bridges 44, 46 are connected to two of the groups desired to be protected, and each of bridges 44, 46 (which are typically three-phase) are connected via lines 48, 50 to a single capacitor-resistor network 52. Additionally, the neutral line 42 may be connected to network 52 via line 54.

Figure 4:
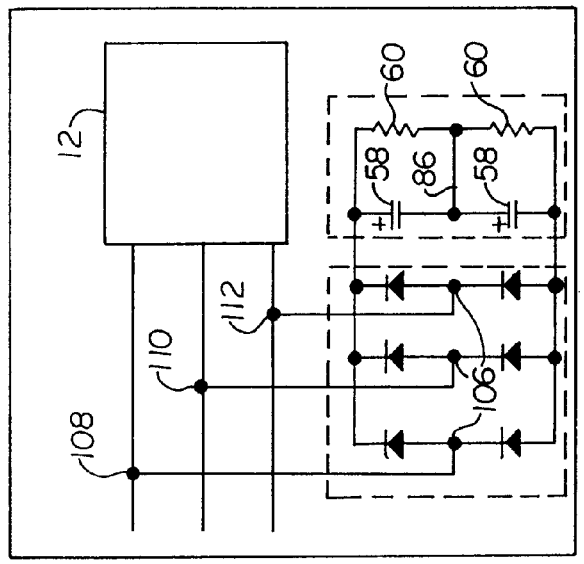
FIG. 4 is a circuit diagram of a three-phase, three-wire embodiment useful in the practice of the present invention.
Figure 5:
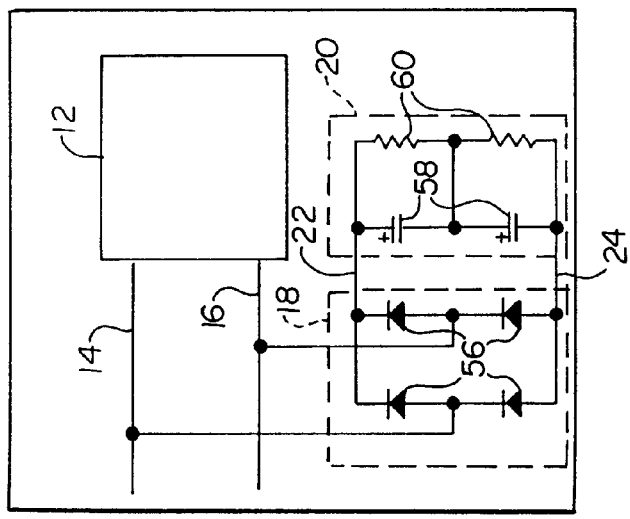
FIG. 5 is a circuit diagram of a three-phase, four wire embodiment useful in the practice of the present invention.

Circuit details of a single-ended, single-source three-phase arrangement may be seen in FIG. 4 for a three wire arrangement and in FIG. 5 for a four wire arrangement, respectively. In FIG. 5, a neutral terminal 113 is ordinarily connected to the circuit to be protected and is preferably connected to the "center tap" or common junction between the series capacitors 58 and between the series resistors 60, referred to hereinafter as a short circuit connection 86. As an optional variation on FIG. 5, a MOV (metal oxide varistor) surge suppressor 98 may also be connected to short circuit connection 86. The other end of MOV 98 is preferably connected to an earth ground connection 99. Connecting an MOV in the manner described with respect to FIG. 5 will clamp voltage transients from raising the voltage on the neutral terminal 113 above the MOV clamping level, which is typically selected to be substantially less (i.e., 1/10th or less) than the line voltage of the "live" terminals (line to line or line to neutral voltages, as the case may be).

Figure 7:
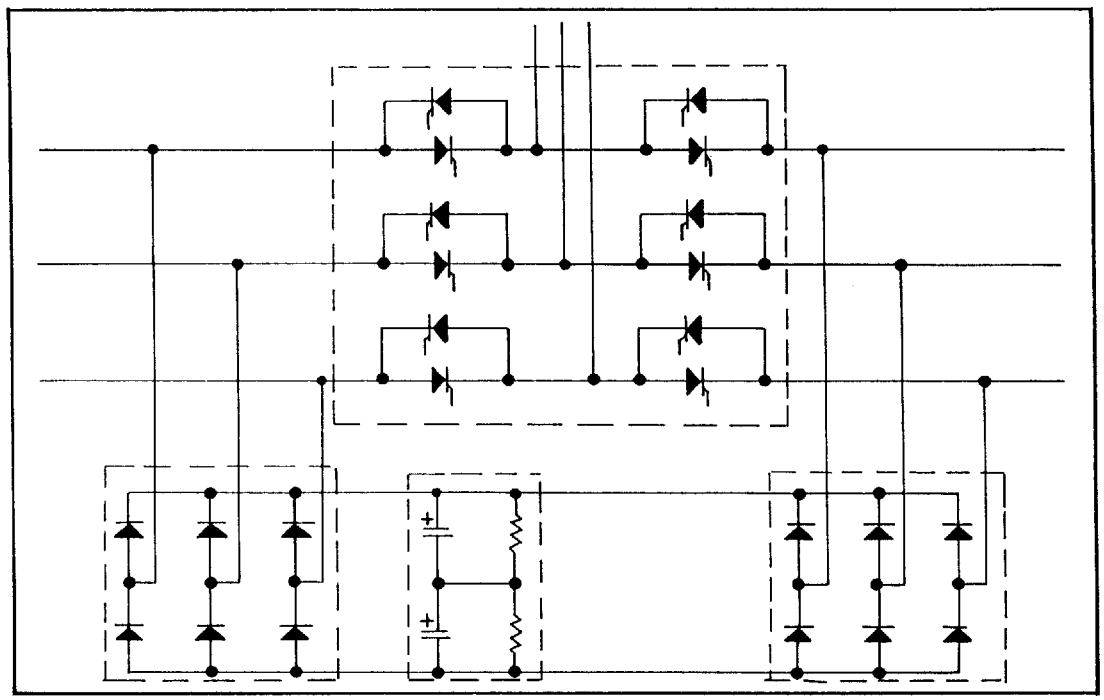
FIG. 7 is a circuit diagram corresponding to FIG. 2 and showing a three-phase, three wire embodiment useful in the practice of the present invention.
Figure 6:
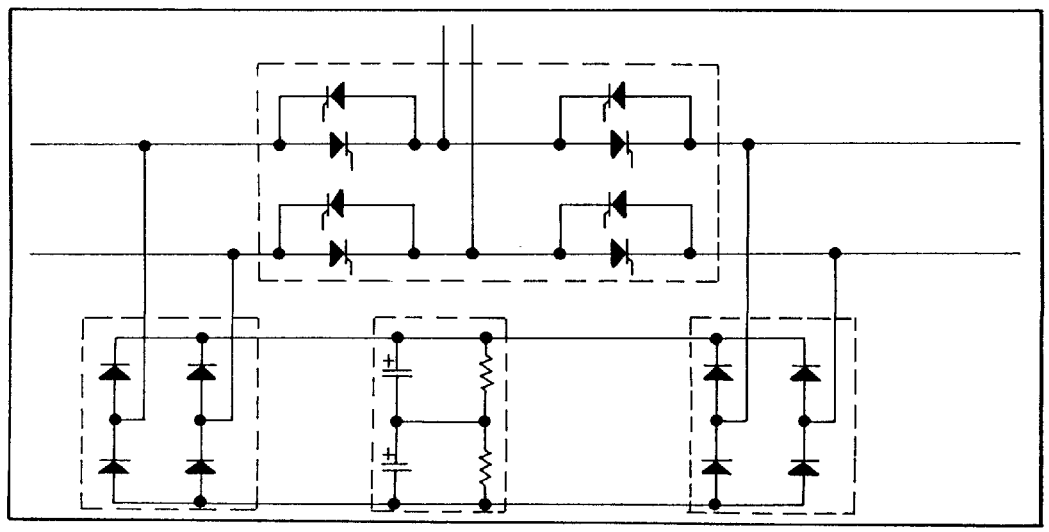
FIG. 6 is a circuit diagram corresponding to FIG. 2 and showing a single-phase static transfer switch embodiment of the present invention.
Figure 8:
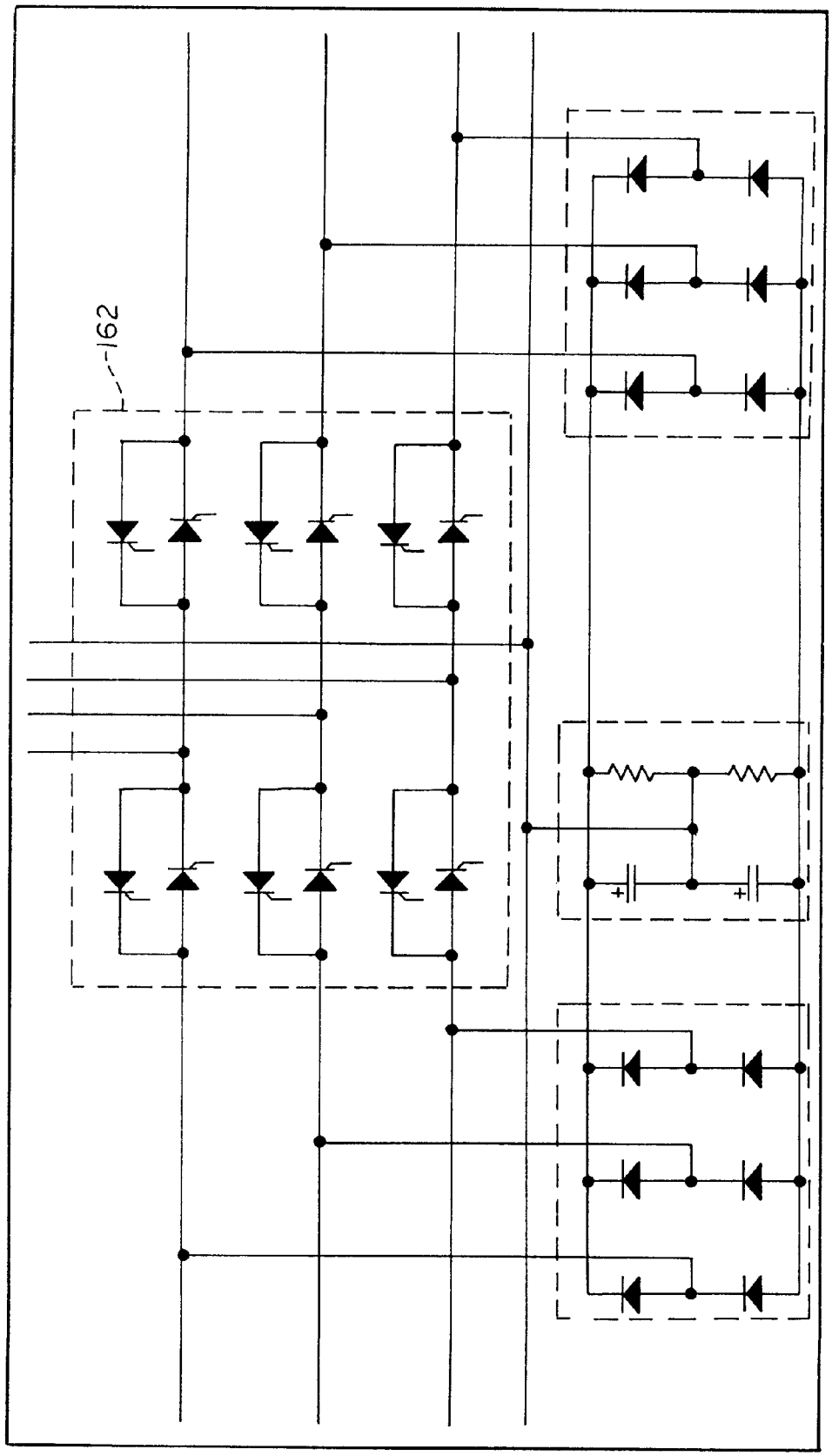
FIG. 8 is a circuit diagram corresponding to FIG. 2 and showing a three-phase, four-wire static transfer switch arrangement useful in the practice of the present invention.

Circuit details of a single-phase, two wire static transfer switch arrangement may be seen in FIG. 6. Circuit details of a three-phase, three wire static transfer switch arrangement are shown in FIG. 7. A three-phase, four wire static transfer switch circuit may be seen in FIG. 8.

Figure 9:
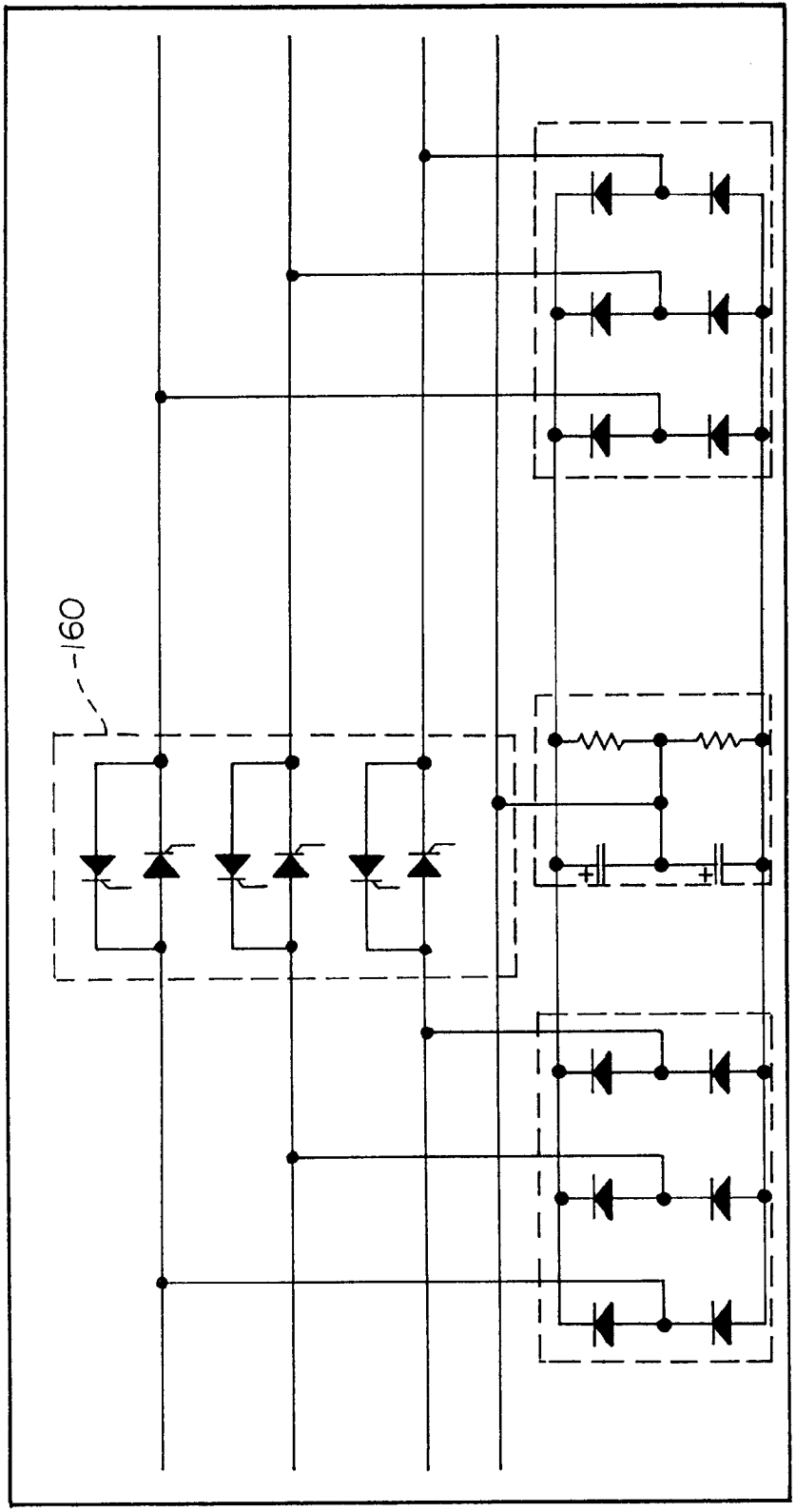
FIG. 9 is a circuit diagram corresponding to FIG. 2 and showing a solid state interrupter in a three-phase, four-wire arrangement useful in the practice of the present invention.

A circuit for a three-phase, four wire solid state interrupter may be seen in FIG. 9.

Referring now again to FIG. 3, the diode bridge 18 is preferably made up of four diodes 56 sized to handle the voltages and currents as is done in a conventional manner, for example 200 ampere continuous rated diodes would typically withstand a transient current of several thousand amperes. Capacitors 58 are preferably 50 to 100 microfarads, with an appropriate voltage rating, and of a type and size to handle high peak currents such as are available as a polypropylene film type. Resistors 60 are preferably a low inductance type of 50K ohms. The resistors 60 are used to bleed down the voltage on the capacitors 58. The time constant is preferably chosen to be consistent with the anticipated or expected repetition rate of voltage surges. A conventional active controlled bleeder (not shown) may also be used to reduce the continuous power dissipation of the bleeder circuit.

Figure 10:
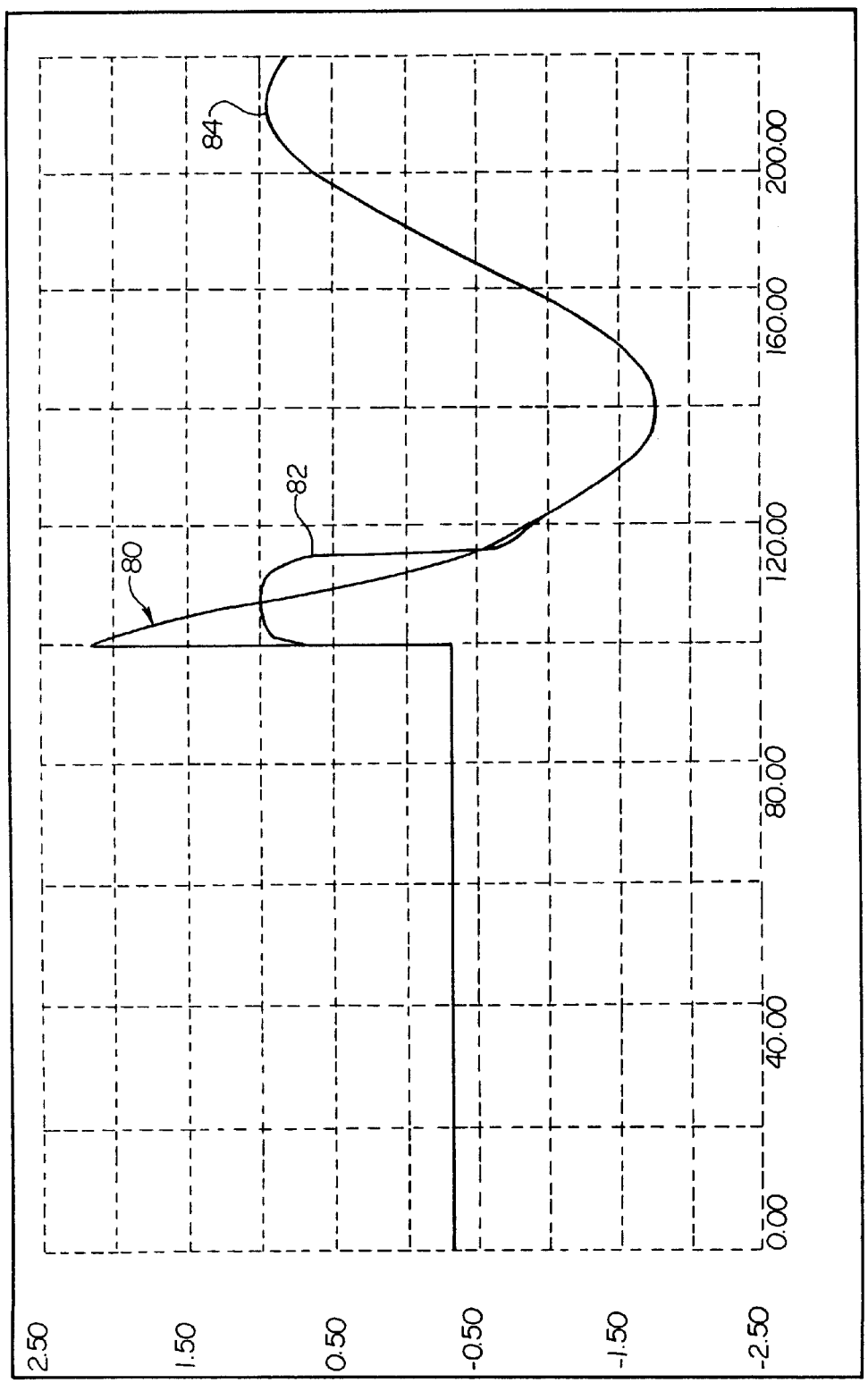
FIG. 10 is a waveform showing the operation of the present invention.

Referring now to FIG. 10, a computer simulation of the waveforms associated with the present invention may be seen. FIG. 10 illustrates a voltage transient or spike 80 of about 2.5 KV peak amplitude commencing at time T=100 microseconds. Waveform 82 illustrates the clamping action of the present invention according to the embodiment illustrated in FIG. 7 and shows that the peak voltage is clamped to the peak value 84 of the steady state sinusoidal voltage waveform plus a forward diode drop.

Figure 11:
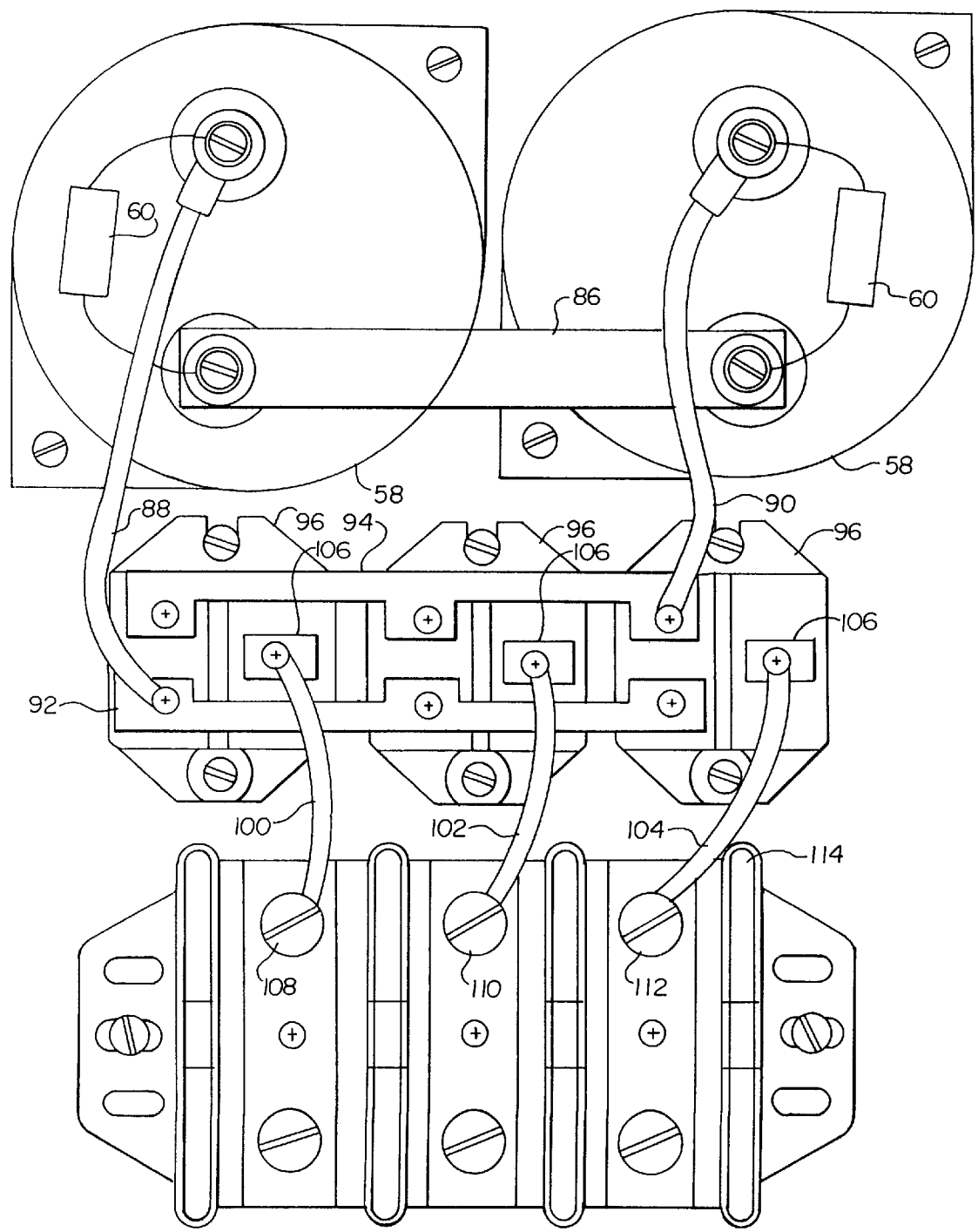
FIG. 11 is a plan layout of a medium inductance version of capacitors, resistors and diodes useful in the practice of the present invention.

It is to be understood that the wiring from the diodes 56 to the power line interception is desirably very short. In the embodiment shown in FIG. 11, a panel-mounted version of a three-phase, three-wire embodiment corresponding to FIG. 4 with "medium inductance" is shown. Each capacitor 58 (preferably of 150 microfarads) is connected in parallel with a resistor 60, preferably of 50K ohms. A buss bar 86 is used to provide the "center connection" between capacitors 58 and resistors 60. A pair of short, heavy conductors 88, 90 connect respective ends of the capacitors 58 to respective diode buss bars 92, 94. In the embodiment shown in FIG. 11, three encapsulated diode pairs 96 each have a short, heavy lead 100, 102, 104 connected from the common junctions 106 of the diode pairs 96 to respective terminals 106, 108, 110 on a terminal block 112. The preferred choice for diode pairs 96 is a model CDD11610 available from Powerex, Inc., of 200 Hillis Street, Youngwood, Pa. 15697-1800.

Figure 12:
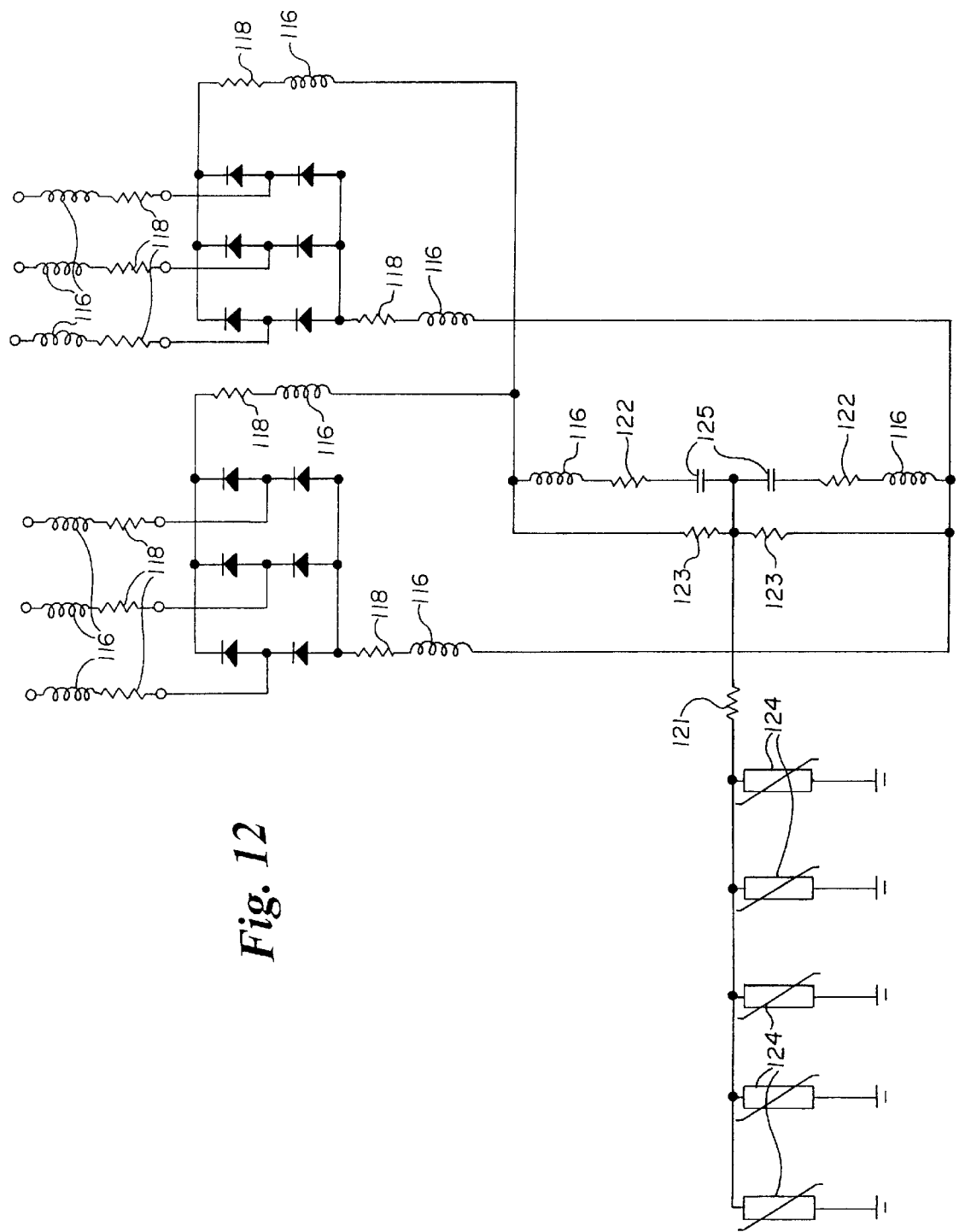
FIG. 12 is a circuit diagram of an alternative embodiment of the present invention useful in clamping phase-to-phase voltage surges.
Figure 24:
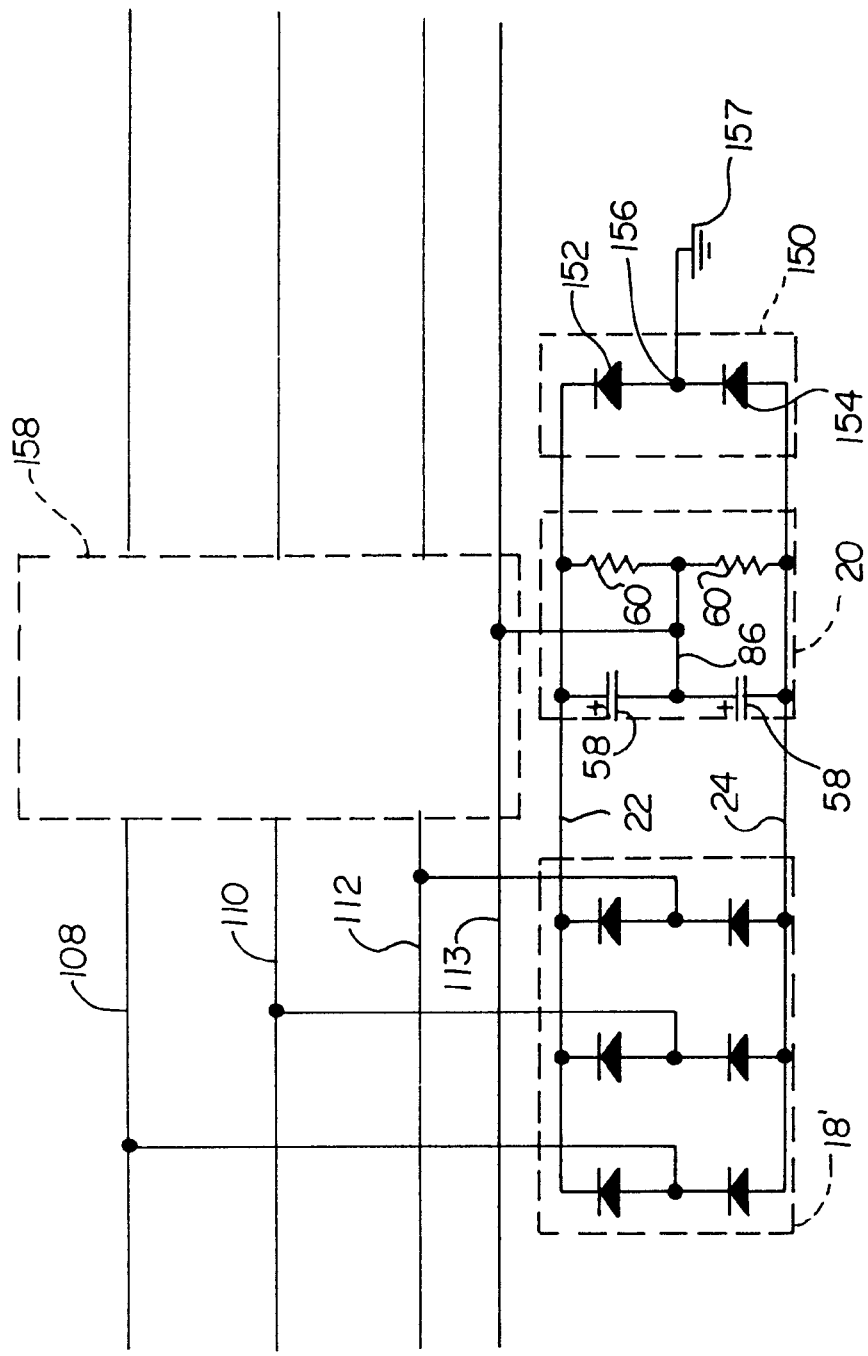
FIG. 24 is a further embodiment showing a diode clamp-to-ground circuit useful in the practice of the present invention.

Referring now to FIG. 12, a still further alternative embodiment of the present invention may be seen. In this embodiment, the diode-capacitor clamp is arranged and used to limit phase-to-phase surges. This embodiment has a plurality of Metal Oxide Varistors or MOVs 124 connected from a neutral connection to ground. This arrangement electrical transients from causing significant transient overvoltages from appearing on the circuit neutral terminal. In this embodiment, a type V131HA40 MOV available from Harris Semiconductor, at 1301 Woody Barke Road, Melbourne, Fla. 32901, is preferred. That MOV is a 120 volt rated part and will clamp the neutral to earth ground at about the rated value. Using such a circuit arrangement permits the use of much lower rated MOV's than would be necessary for a circuit in which the MOV's were placed across the "live" terminals of the electrical source, or even for a circuit in which the MOV's were placed from a "live" terminal to neutral or ground. Furthermore, using the MOV's in such a configuration eliminates the "partial" conduction in the MOV's that may occur in the event of slightly high average or steady state line voltage, were the MOV's to be placed directly across the live terminals, a condition known to be detrimental and even destructive to the MOV's. Connecting the MOV's between the capacitor "center-tap" and earth ground will eliminate such partial conduction, even when a system neutral is connected to the center-tap because the voltage of the floating neutral is typically a few volts, at most, while the preferred and commercially available MOV's are desirably rated at or above 120 volts. Clamping the center-tap (and the system neutral) at about 120 volts will reduce stresses that could otherwise appear in the system due to common-mode transients raising the center-tap (and neutral, where present) to substantially higher voltages. A diode clamp circuit, described infra with respect to FIG. 24 is also an option to achieve the benefits available through the use of MOV's as shown.

Figure 15:
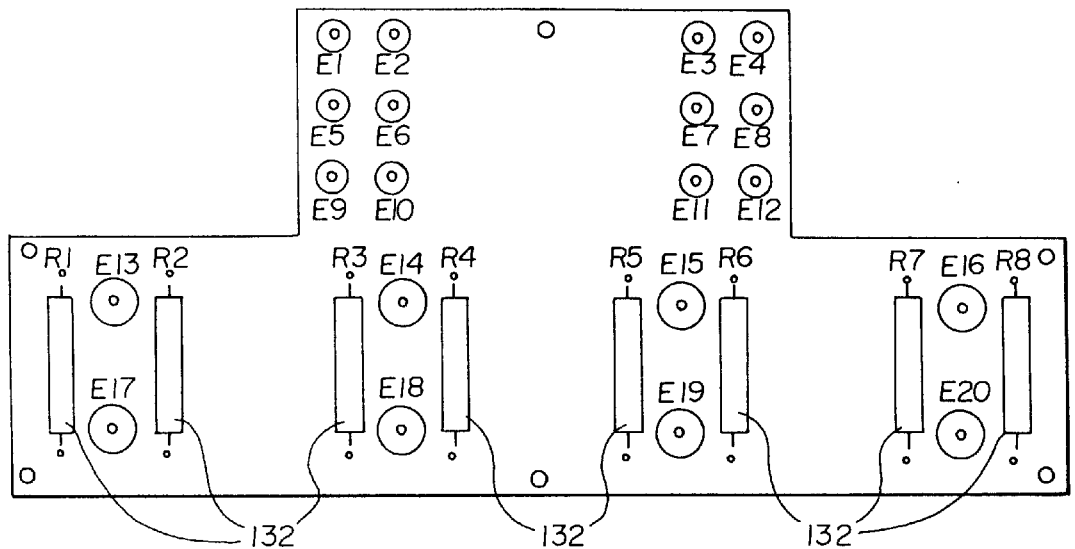
FIG. 15 is a parts layout for the filter circuit of FIG. 14, viewed from the component side.
Figure 16:
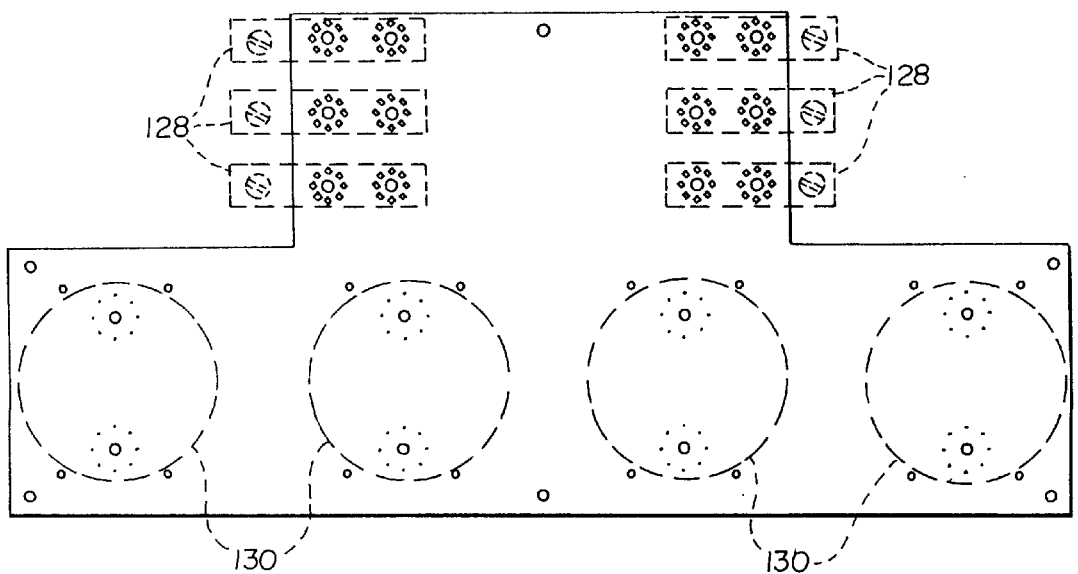
FIG. 16 is a template for plated through holes for a printed wiring board of the filter circuit of FIG. 14.
Figure 17:
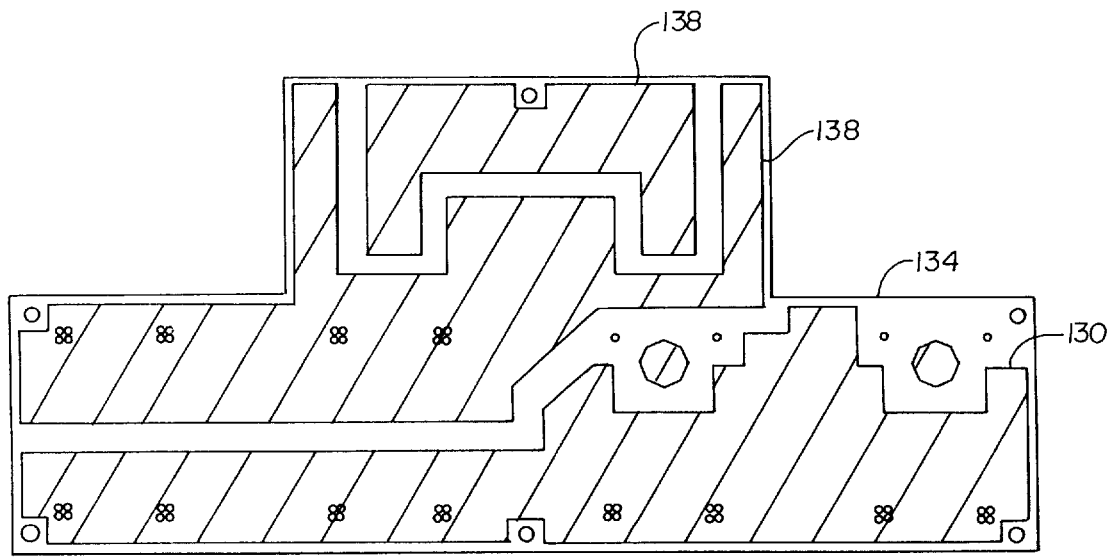
FIG. 17 is a is solder side view of the printed wiring board of FIG. 16 viewed from the component side.
Figure 18:
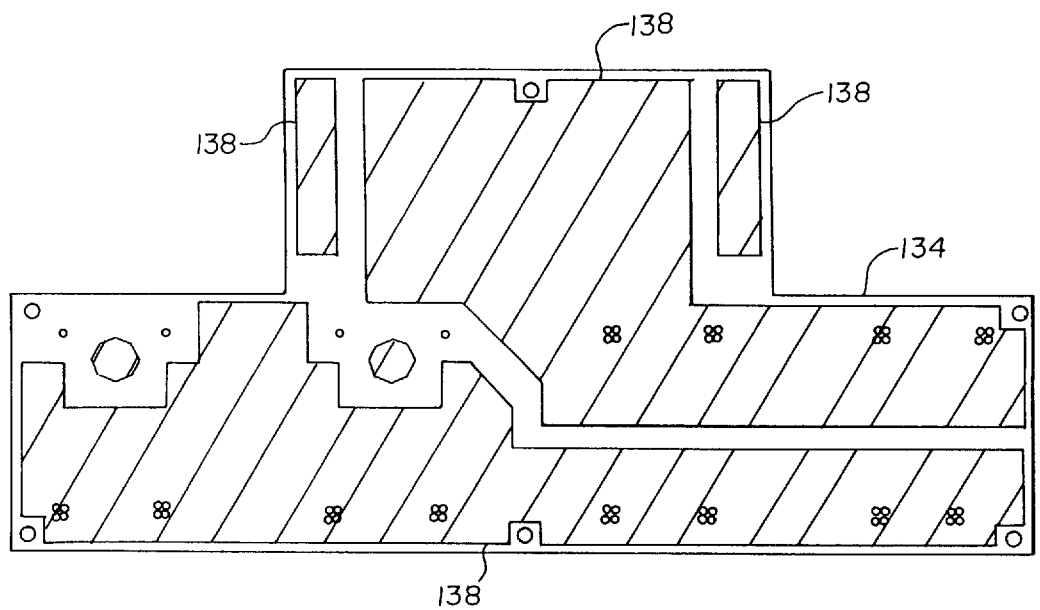
FIG. 18 is a component side view of the printed wiring board of FIG. 16 viewed from the component side.

In the schematic of FIG. 12, the effective series inductances and effective series resistances of the wiring are shown as discrete components, even though these are in reality distributed values for these parameters, in order to provide an effective model for the waveform simulations of FIG. 15. Distributed inductance 116 is 25 nanohenrys, distributed resistance 118 is 1 milliohm, distributed resistance 121 is 1 micro-ohm, and distributed resistance 122 is 0.67 milliohms. The discharge resistors 123 are 2K ohms, and the spike (voltage transient) suppression capacitors 125 are 300 microfarads.

Figure 13:
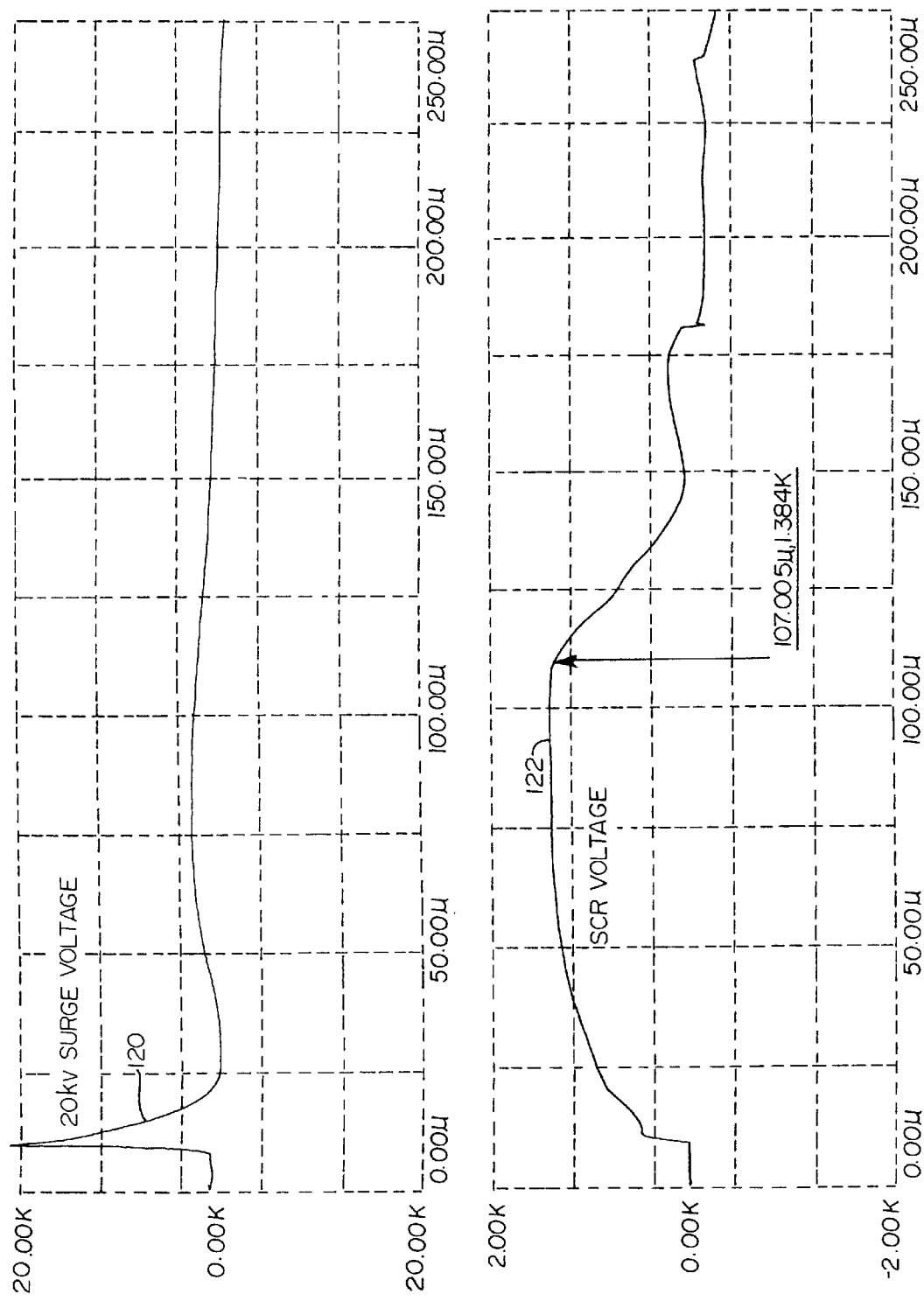
FIG. 13 is a simulation of a 20 KV surge and the resulting SCR voltage using the embodiment of FIG. 12.
Figure 14:
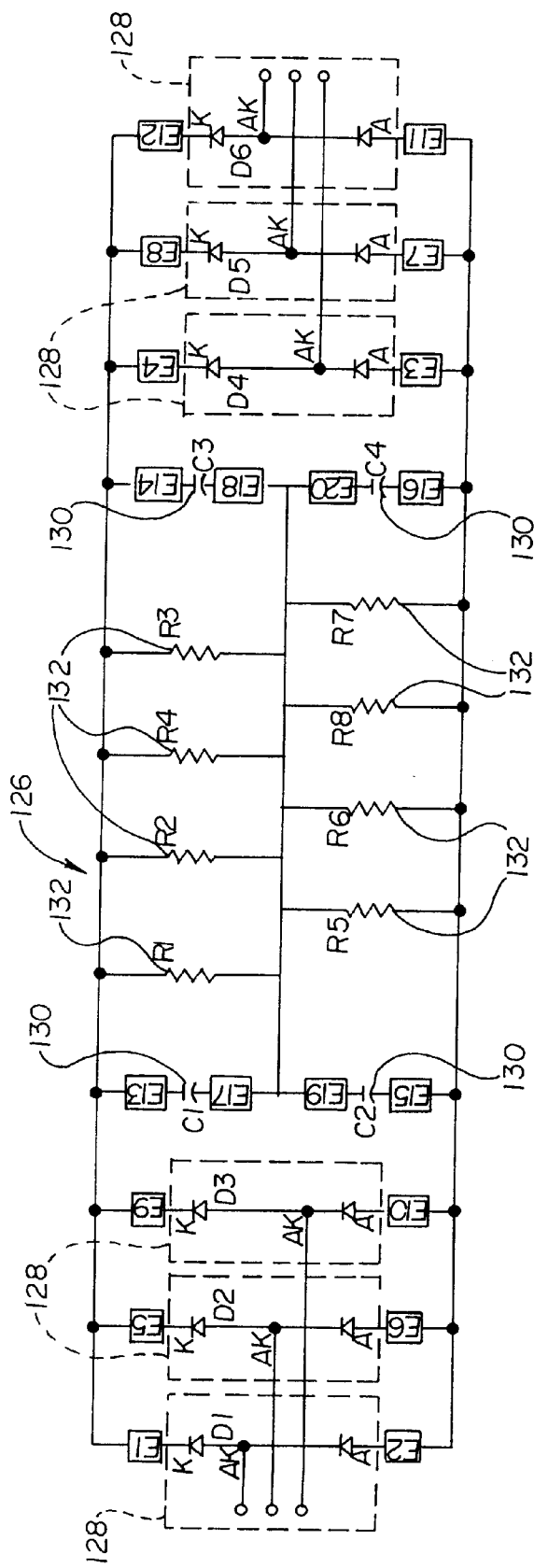
FIG. 14 is a schematic of a low inductance input filter according to the topology of FIG. 7.

Referring now to FIG. 13, a simulation of the operation of the embodiment shown in FIG. 12 may be seen. Waveform 120 illustrates a 20 KV transient surge voltage. Waveform 122 illustrates that the peak SCR voltage is 1.384 KV and occurs at 107.005 microseconds for a transient initiating at 10.0 microseconds. It is to be understood that the simulation described and the waveforms shown herein conform to IEEE Standard C62.41-1991, location category C3.

Referring now to FIGS. 14–18, this filter 126 is preferably made up of six modules 128, each of which contain a set of two diodes with a common connection. Module 128 is preferably a model CDD11610 available from Powerex. Capacitors 130 are preferably 150 microfarads, and mounted below a printed wiring board 134. Filter 126 also preferably has eight 27K ohm resistors connected in series-parallel as shown. The printed wiring board 134 is preferably ¹⁄₁₆" double sided copper clad plastic with plated through holes. The copper lands 138 are shown hatched for clarity, but it is to be understood that the copper layers cover the majority of the surface area of each side of the board 134.

Figure 19:
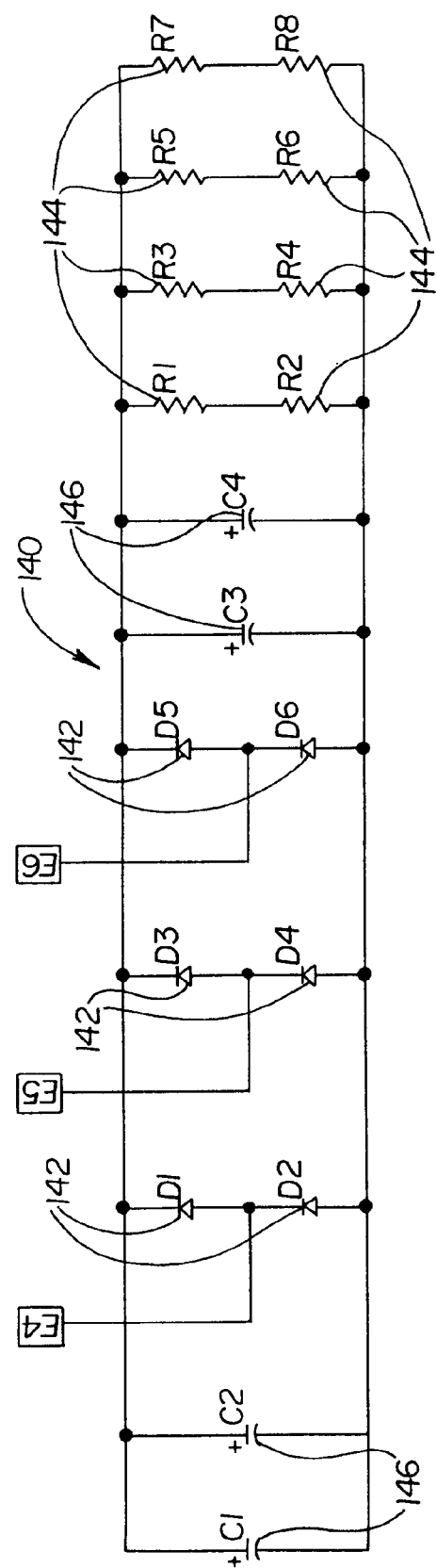
FIG. 19 is a schematic of a low inductance output filter similar to the topology of FIG. 4.
Figure 20:
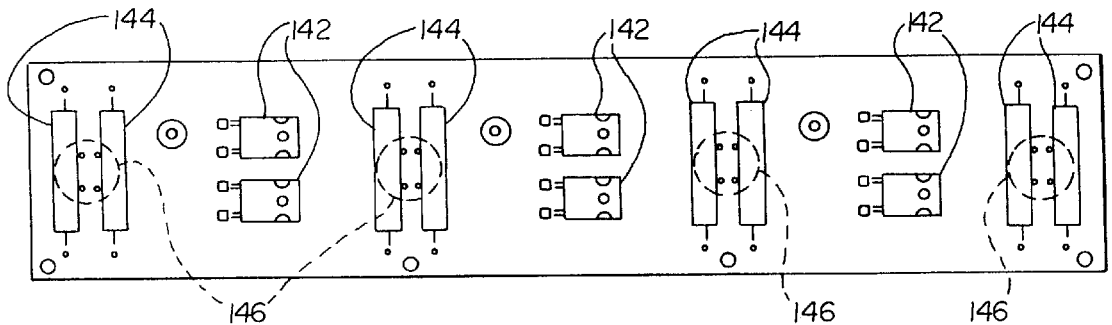
FIG. 20 is a parts layout for the filter circuit of FIG. 19, viewed from the component side.
Figure 21:
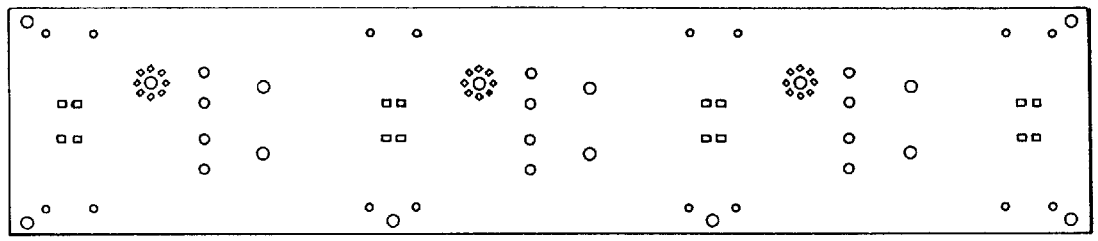
FIG. 21 is a template for plated through holes for a printed wiring board of the filter circuit of FIG. 19.
Figure 22:
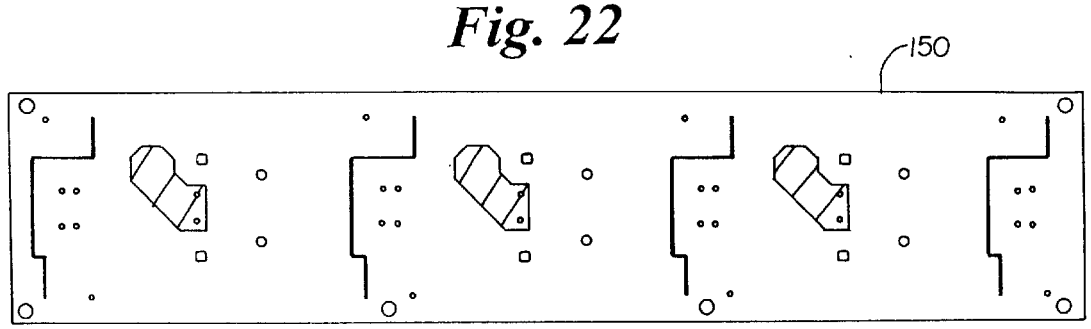
FIG. 22 is a is component side view of the printed wiring board of FIG. 21 viewed from the component side.
Figure 23:
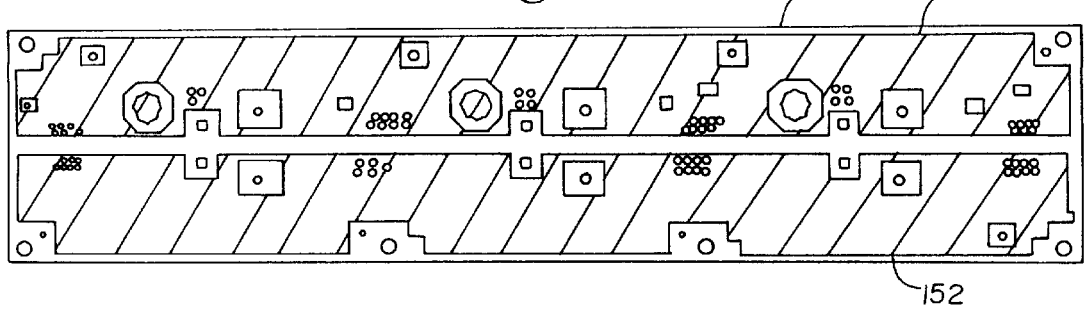
FIG. 23 is a is solder side view of the printed wiring board of FIG. 16 viewed from the component side.

Referring now to FIGS. 19–23, another low inductance filter 140 may be seen. Filter 140 is intended for use where the source has inductance in series with it to limit the spike current. Filter 140 has six individual diodes 142, preferably a model RHRG 30120 (in a TO-247 package?) available from Harris Semiconductor. Filter 140 also has eight 25K ohm resistors 144 connected in series-parallel relationship, as shown in FIG. 19. Filter 140 also preferably has four capacitors 146, each 7 microfarads, 1200V. Capacitors 146 are preferably miniature film UP36 series capacitors available from Electronic Concepts, Inc. of 528 Industrial Way, Eatontown, N.J. 07724 as part number UP36BN0070. FIG. 20 shows the component placement (including the location of capacitors 146 which are to be understood as being mounted on the side of the printed wiring board opposite the side on which the resistors and diodes are mounted, while FIG. 21 shows the plated through hole pattern, and FIG. 22 shows the component side of printed wiring board 150. FIG. 23 shows the reverse or solder side of the board 150, viewed from the component side, with copper lands 152, 154 shown hatched for clarity. It is to be understood that the layout of components is ordinarily to be designed to be of as low inductance as conveniently possible. In particular, in the printed wiring board versions of the present invention, it may be seen that the capacitors are mounted on a side of the printed wiring board opposite the resistors and diodes to achieve this end.

Referring now to FIG. 24, another embodiment of the present invention is shown to illustrate a further variation and feature of the present invention suitable for any of the previously described embodiments in applications having access to an earth or frame ground with or without a neutral terminal in the system. In this embodiment, common mode transients that would otherwise raise the potential of the short circuit connection 86 to an excessive voltage potential will be clamped and limited substantially to no more than the peak line voltage on lines 108–112.

In this embodiment, a diode clamp circuit 150 has a first diode 152 connected to line 22 from the resistor-capacitor network 20. Circuit 150 also has a second diode 154 connected to line 24 of network 20. An anode of diode 152 and a cathode of diode 154 are connected together at a center tap connection 156. Center tap connection 156 is connected to an earth or frame ground 157. Subsystem 158 may be a load or unit to be protected such as unit 12, shown in FIG. 1, or unit 28 shown in FIG. 2. It is to be understood that unit 28 may be a Solid State Interrupter (such as unit 160 in FIG. 9) or a Static Transfer Switch (such as unit 162 in FIG. 8).

In operation, the embodiment of FIG. 24 will clamp the resistor-capacitor network 20 (and the system neutral 113, if present and connected to the resistor-capacitor network 20) to prevent either of lines 22 or 24 from substantially exceeding twice the peak line voltage to which capacitors 58 are charged. It is to be understood that the voltage on line 22 or 24 will at most be twice peak line voltage plus one forward voltage diode drop with respect to earth ground 157, since either diode 152 or 154 will be forward biased when a transient attempts to increase the potential on line 22 or 24 beyond twice the peak line voltage. Once forward biased, that diode will hold the line to which is it connected substantially at one diode drop away from the "zero" voltage of earth ground 157. Since resistors 60 will balance the voltages across the capacitors 58, the short circuit connection 86 (and the system neutral 113 if connected thereto) will be held at a voltage substantially equal to peak line voltage. Although shown in a three phase, four wire application, it is to be understood that diode clamp circuit 150 is suitable and may be used in single phase systems, with or without a neutral, and in three phase systems such as a "delta" without a neutral, and may also be used when there is no "center tap" between series capacitors in the resistor-capacitor circuit, such as appears in FIG. 19. The transients appearing between live terminals "line-to-line" or appearing "line-to-neutral" may be considered "differential-mode" transients (whether the system is single phase or three-phase). Transients appearing between any of the live terminals of the system (or the system neutral) and earth ground are "common-mode" transients. It is to be understood that certain transients, especially transients caused by disturbances external to the system, may have both common-mode and differential-mode components or characteristics.

The invention is not to be taken as limited to all of the details thereof as modifications and variations thereof may be made without departing from the spirit or scope of the invention. For example, the various circuit configurations shown which have a neutral terminal or connection may also include one or more MOV's connected from the neutral terminal to an earth ground connection. Furthermore, the series arrangement of the capacitors may be replaced in the various embodiments with a single capacitor, if such is available at a voltage rating sufficient to meet the application requirements. Similarly, the series arrangement of the resistors may be replaced with a single resistor if such is available with appropriate voltage and power ratings. Furthermore, the short circuit connection between the series resistor and the series capacitors may be omitted, while still remaining within the broadest scope of the present invention, if the voltage balancing provided by such a connection is not required, such as (but not necessarily limited to) when a MOV is connected between the center tap of a series connection of capacitors and an earth ground connection.

What is claimed is:

1. A voltage spike suppressor for substantially eliminating voltage transients exceeding peak line voltage of a source of electricity having at least a first and a second terminal, the suppressor comprising:

a) a diode network having at least four diodes connected across the terminals of the source;

b) a parallel-connected capacitor-resistor network having a pair of capacitors connected in series with each other and a pair of resistors connected in series with each other, with the capacitor pair connected in parallel with the resistor pair and each of the pair of capacitors and resistors have an intermediate terminal therebetween and the respective intermediate terminals are connected together by a short circuit;

wherein i) a first diode in the diode network has an anode connected to the first terminal and a cathode connected to a first end of the capacitor-resistor network, ii) a second diode in the diode network has a cathode connected to the second terminal and an anode connected to a second end of the capacitor-resistor network, iii) a third diode in the diode network has anode connected to the second terminal and a cathode connected to the first end of the capacitor-resistor network, and iv) a fourth diode in the diode network has a cathode connected to the first terminal and an anode connected to the second end of the capacitor-resistor network such that the diode network provides a current path for energy in an electrical transient on either the first or second terminals to be coupled from the terminals to the capacitor-resistor network to prevent an overvoltage condition at the terminals; and c) a diode clamp circuit having a pair of diodes wherein i) a first diode in the diode clamp circuit has a cathode directly connected to the first end of the capacitor-resistor network, ii) a second diode in the diode clamp circuit has an anode directly connected to the second end of the capacitor-resistor network, and iii) an earth ground connected to an anode of the first diode in the diode clamp circuit and a cathode of the second diode in the diode clamp circuit such that common-mode voltage transients at the capacitor-resistor network exceeding the peak line voltage are clamped to earth ground by the diode clamp circuit.

2. The suppressor of claim 1 further comprising a metal oxide varistor having a rated clamping level and connected between the short circuit and an earth ground such that the metal oxide varistor will limit voltage transients on the short circuit to the rated clamping level of the metal oxide varistor.

3. The suppressor of claim 1 wherein the source of electricity includes a solid state interrupter switch capable of interrupting a bidirectional current path between at least the first terminal and a third terminal and between at least the second terminal and a fourth terminal and wherein the diode network is a first diode network and the suppressor further includes a second diode network having identical topology to the first diode network except connected to the third and fourth terminals and wherein the second diode network is connected to the capacitor-resistor network such that the first diode network provides a current path for energy in an electrical transient on either the first or second terminals to be coupled to the capacitor-resistor network and the second diode network provides a current path for energy in an electrical transient on either the third or fourth terminals to be coupled to the capacitor-resistor network to prevent an overvoltage condition at any of the first through fourth terminals.

4. The suppressor of claim 3 wherein the solid state interrupter is capable of interrupting a bidirectional current path between a fifth terminal and a sixth terminal and wherein the solid state interrupter carries three phase power, and further wherein the first diode network of the suppressor includes:
   iv) a fifth diode having an anode connected to the fifth terminal and a cathode connected to the first end of the capacitor-resistor network, and
   v) a sixth diode having a cathode connected to the fifth terminal and an anode connected to the second end of the capacitor-resistor network such that electrical transients that would otherwise appear on the fifth terminal are suppressed.

5. The suppressor of claim 3 wherein the second diode network of the suppressor includes:
   vi) a fifth diode having an anode connected to the sixth terminal and a cathode connected to the first end of the capacitor-resistor network, and
   vii) a sixth diode having a cathode connected to the sixth terminal and an anode connected to the second end of the capacitor-resistor network such that electrical transients that would otherwise appear on the sixth terminal are suppressed.

6. The suppressor of claim 3 wherein the capacitor-resistor network comprise a pair of capacitors connected in series with each other and the network further includes a pair of resistors connected in series with each other, with the capacitor pair connected in parallel with the resistor pair and wherein each of the pair of capacitors and resistors have an intermediate terminal therebetween and the respective intermediate terminals are connected together by a short circuit and wherein the source has a neutral terminal connected to the short circuit between the intermediate terminals of the capacitor-resistor network.

7. The suppressor of claim 6 further including at least one metal oxide varistor connected between the short circuit and an earth ground connection to clamp the voltage that may appear at the short circuit connecting the intermediate terminals of the capacitor-resistor network.

8. A voltage spike suppressor for substantially eliminating voltage transients exceeding peak line voltage of a source of electricity having at least a first and a second terminal, the suppressor comprising:
   c) a diode network having at least four diodes connected across the terminals of the source; and
   d) a parallel-connected capacitor-resistor network; wherein
      v) a first diode in the diode network has an anode connected to the first terminal and a cathode connected to a first end of the capacitor-resistor network,
      vi) a second diode in the diode network has a cathode connected to the second terminal and an anode connected to a second end of the capacitor-resistor network,
      vii) a third diode in the diode network has anode connected to the second terminal and a cathode connected to the first end of the capacitor-resistor network, and
      viii) a fourth diode in the diode network has a cathode connected to the first terminal and an anode connected to the second end of the capacitor-resistor network such that the diode network provides a current path for energy in an electrical transient on either the first or second terminals to be coupled from the terminals to the capacitor-resistor network to prevent an overvoltage condition at the terminals; and wherein the source of electricity has a third terminal and carries three phase power, and further wherein the diode network further comprises
   v) a fifth diode having an anode connected to the third terminal and a cathode connected to the first end of the capacitor-resistor network, and
   vi) a sixth diode having a cathode connected to the third terminal and an anode connected to the second end of the capacitor-resistor network;

and wherein the capacitor-resistor network includes a pair of capacitors connected in series with each other and a pair of resistors connected in series with each other, with the capacitor pair connected in parallel with the resistor pair, and wherein each of the pair of capacitors and resistors have an intermediate terminal therebetween and the respective intermediate terminals are connected together by a short circuit;

and wherein the source of electricity includes a static transfer switch capable of switching a load from at least the first and second terminals to at least a third and a fourth terminal and the diode bridge is a first diode network and the suppressor further comprises a second diode network having identical topology to the first diode network except connected to the third and fourth terminals and wherein the second diode network is connected to the capacitor-resistor network such that the first diode network provides a current path for energy in an electrical transient on either the first or second terminals to be coupled to the capacitor-resistor network and the second diode network provides a current path for energy in an electrical transient on either the third or fourth terminals to be coupled to the capacitor-resistor network to prevent an overvoltage condition at any of the first through fourth terminals.

9. The suppressor of claim 8 wherein the source has a fifth terminal connected to the short circuit between the intermediate terminals of the capacitor-resistor network.

10. The suppressor of claim 8 wherein the capacitor-resistor network comprises a pair of capacitors connected in series with each other and a pair of resistors connected in series with each other, with the capacitor pair connected in parallel with the resistor pair and wherein each of the pair of capacitors and resistors have an intermediate terminal therebetween and the respective intermediate terminals are connected together by a short circuit and wherein the source has a neutral terminal connected to the short circuit between the intermediate terminals of the capacitor-resistor network.

11. The suppressor of claim 8 wherein the static transfer switch is further capable of switching a load from a fifth terminal to a sixth terminal and carries three phase power, and further wherein the first diode network of the suppressor includes:
   iv) a fifth diode having an anode connected to the fifth terminal and a cathode connected to the first end of the capacitor-resistor network, and
   v) a sixth diode having a cathode connected to the fifth terminal and an anode connected to the second end of the capacitor-resistor network such that electrical transients that would otherwise appear on the fifth terminal are suppressed.

12. The suppressor of claim 11 wherein the second diode network of the suppressor includes:

vi) a fifth diode having an anode connected to the sixth terminal and a cathode connected to the first end of the capacitor-resistor network, and vii) a sixth diode having a cathode connected to the sixth terminal and an anode connected to the second end of the capacitor-resistor network such that electrical transients that would otherwise appear on the sixth terminal are suppressed.

13. The suppressor of claim 11 wherein the capacitor-resistor network comprises a pair of capacitors connected in series with each other and a pair of resistors connected in series with each other, with the capacitor pair connected in parallel with the resistor pair and wherein each of the pair of capacitors and resistors have an intermediate terminal therebetween and the respective intermediate terminals are connected together by a short circuit and wherein the source has a neutral terminal connected to the short circuit between the intermediate terminals of the capacitor-resistor network.

14. A method of suppressing voltage transients exceeding peak line voltage of a source of electricity having at least a first and a second terminal, the method comprising the steps of:

a) directing overvoltage transients from one of the first and second terminals through a diode network to a capacitor-resistor network having a pair of capacitors connected in series with each other with an intermediate terminal therebetween, and a pair of resistors connected in series with each other with an intermediate terminal therebetween and wherein the intermediate terminal of the capacitors is connected by a short circuit to the intermediate terminal of the resistors;

b) absorbing the energy present in the overvoltage transient in a capacitor in the capacitor-resistor network;

c) dissipating the energy absorbed in step b) in the resistors in the capacitor-resistor network; and e) directing common mode overvoltage transients through a diode clamp circuit directly connected between the capacitor-resistor network and an earth ground such that the capacitor-resistor network is clamped at substantially twice the peak line voltage of the source of electricity.

15. The method of claim 14 further wherein the source of electricity has a third terminal that is a neutral terminal, the method further comprising the additional step of:

f) directing electrical transients appearing on the neutral terminal to a metal oxide varistor connected between the neutral terminal and an earth ground connection to clamp the voltage that would otherwise appear at the neutral terminal with respect to the earth ground connection as a result of the electrical transients.

16. Apparatus for suppressing voltage transients in a three-phase system comprising:

a) a diode network having three pairs of series connected diodes, each pair of diodes having a center-tap between the series connected diodes, with the center-tap connected to respective line terminals of the three phase system and with each of the pairs of diodes connected in parallel diode circuit;

b) a capacitance having a center tap, the capacitance connected across the parallel diode circuit, c) a resistance having a center tap, the resistance connected across the capacitance, and the center taps of the capacitance and resistance being connected together such that the capacitance will suppress voltage transients appearing between the lines of the three-phase system by accumulating an additional charge and the resistance will discharge the accumulated additional charge in the capacitance resulting from the voltage transient and the connection between the center taps will balance the voltage across the capacitance; and d) a diode clamp circuit having a fourth pair of diodes connected in series with each other forming a center tap therebetween, the diode clamp circuit directly connected across the diode network with the center-tap of the diode clamp circuit connected to an earth ground such that common-mode transients between at least one of the line terminals of the three-phase system and earth ground are clamped to earth ground when the level of the voltage transient is sufficient to drive at least one of the diodes in the diode clamp circuit into conduction.

17. The apparatus of claim 16 wherein the three-phase system has a neutral terminal and the capacitance further includes a pair of capacitors having a center-tap therebetween, with the center-tap of the capacitance connected to the neutral terminal such that a line-to-neutral voltage transient is suppressed by the capacitance.

18. A voltage spike suppressor for substantially eliminating voltage transients exceeding peak line voltage of a source of electricity having at least a first terminal, a second terminal, and a neutral terminal, the suppressor comprising:

e) a diode network having at least four diodes connected across the first and second terminals of the source;

f) a parallel-connected capacitor-resistor network having a pair of capacitors connected in series with each other and a pair of resistors connected in series with each other, with the capacitor pair connected in parallel with the resistor pair and each of the pair of capacitors and resistors have an intermediate terminal therebetween and the respective intermediate terminals are connected together by a short circuit and the short circuit connected to the neutral terminal of the source;

wherein i) a first diode in the diode network has an anode connected to the first terminal and a cathode connected to a first end of the capacitor-resistor network, ii) a second diode in the diode network has a cathode connected to the second terminal and an anode connected to a second end of the capacitor-resistor network, iii) a third diode in the diode network has anode connected to the second terminal and a cathode connected to the first end of the capacitor-resistor network, and iv) a fourth diode in the diode network has a cathode connected to the first terminal and an anode connected to the second end of the capacitor-resistor network such that the diode network provides a current path for energy in an electrical transient on either the first or second terminals to be coupled from the terminals to the capacitor-resistor network to prevent an overvoltage condition at the terminals; and c) a diode clamp circuit having a pair of diodes wherein i) a first diode in the diode clamp circuit has a cathode directly connected to the first end of the capacitor-resistor network, ii) a second diode in the diode clamp circuit has an anode directly connected to the second end of the capacitor-resistor network, and wherein the neutral terminal is connected to an anode of the first diode in the diode clamp circuit and a cathode of the second diode in the diode clamp circuit such that common-mode voltage transients at the capacitor-resistor network exceeding the peak line voltage are clamped to the neutral terminal by the diode clamp circuit.

* * * * *